United States Patent
Liu et al.

(10) Patent No.: US 12,052,604 B2
(45) Date of Patent: Jul. 30, 2024

(54) SELECTING TRANSPORT BLOCKS FOR NETWORK CODING

(71) Applicant: QUALCOMM Incorporated, San Diego, CA (US)

(72) Inventors: Guangyi Liu, San Diego, CA (US); Gabi Sarkis, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 17/444,339

(22) Filed: Aug. 3, 2021

(65) Prior Publication Data

US 2023/0040471 A1 Feb. 9, 2023

(51) Int. Cl.
*H04W 28/06* (2009.01)
*H04L 1/00* (2006.01)
*H04L 5/00* (2006.01)
*H04W 28/08* (2023.01)

(52) U.S. Cl.
CPC ........... *H04W 28/06* (2013.01); *H04L 1/0009* (2013.01); *H04L 5/0094* (2013.01); *H04W 28/0975* (2020.05)

(58) Field of Classification Search
CPC .............. H04W 28/06; H04W 28/0975; H04L 1/0009; H04L 5/0094
USPC ........................................................ 370/329
See application file for complete search history.

(56) References Cited

U.S. PATENT DOCUMENTS

| | | | |
|---|---|---|---|
| 6,188,717 B1* | 2/2001 | Kaiser ................... | H04L 5/0021 375/148 |
| 9,496,897 B1* | 11/2016 | Triandopoulos .... | H04L 63/0435 |
| 2005/0068977 A1* | 3/2005 | Na ......................... | H04H 20/28 370/432 |
| 2006/0133533 A1* | 6/2006 | Khandekar ........... | H04L 1/1861 375/279 |
| 2010/0091801 A1* | 4/2010 | Itakura .................. | H04L 1/1854 370/475 |
| 2014/0211706 A1* | 7/2014 | Kim ....................... | H04L 1/0001 370/329 |
| 2014/0222964 A1* | 8/2014 | Leong ................ | H03M 13/2721 709/219 |
| 2014/0369253 A1* | 12/2014 | Jose ....................... | H04L 1/0058 370/328 |
| 2014/0380133 A1* | 12/2014 | Kim ....................... | H04L 1/0061 714/776 |
| 2015/0085648 A1* | 3/2015 | Leith ....................... | H04L 47/12 370/230 |
| 2015/0155968 A1* | 6/2015 | Grube ..................... | H04L 65/80 714/776 |

(Continued)

*Primary Examiner* — Xuan Lu
(74) *Attorney, Agent, or Firm* — Harrity & Harrity, LLP

(57) ABSTRACT

Various aspects of the present disclosure generally relate to wireless communication. In some aspects, a receiving device may receive, from a transmitting device that is configured to perform network coding on information from an originating device, one or more transport blocks (TBs) including the information and associated with an erasure coding scheme. The receiving device may perform decoding using the erasure coding scheme and at least one TB, of the one or more TBs. The at least one TB is selected using one or more time conditions, one or more group conditions, one or more settings indicated by the transmitting device, or a combination thereof. Numerous other aspects are described.

30 Claims, 9 Drawing Sheets

(56) References Cited

U.S. PATENT DOCUMENTS

| | | | |
|---|---|---|---|
| 2016/0164629 A1* | 6/2016 | Ahn | H04L 1/0041 |
| | | | 714/776 |
| 2017/0118673 A1* | 4/2017 | Narasimha | H04L 1/1671 |
| 2019/0171187 A1* | 6/2019 | Cella | G05B 19/4183 |
| 2020/0177311 A1* | 6/2020 | Ho | H03M 13/373 |
| 2021/0120478 A1* | 4/2021 | Akl | H04L 45/24 |
| 2021/0297180 A1* | 9/2021 | Ma | H04L 1/0041 |
| 2022/0021483 A1* | 1/2022 | Cao | H04L 1/0057 |
| 2022/0021491 A1* | 1/2022 | Zhou | H04L 1/1671 |
| 2022/0173834 A1* | 6/2022 | Vidal | H04L 1/0075 |
| 2022/0329878 A1* | 10/2022 | Da Silva Martins | |
| | | | H04N 21/6375 |
| 2023/0139754 A1* | 5/2023 | Zhu | H04L 1/18 |
| | | | 370/328 |

* cited by examiner

SELECTING TRANSPORT BLOCKS FOR NETWORK CODING

FIELD OF THE DISCLOSURE

Aspects of the present disclosure generally relate to wireless communication and to techniques and apparatuses for selecting transport blocks for network coding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a receiving device. The apparatus may include a memory and one or more processors, coupled to the memory. The one or more processors may be configured to receive, from a transmitting device that is configured to perform network coding on information from an originating device, one or more transport blocks (TBs) including the information and associated with an erasure coding scheme. The one or more processors may be further configured to perform decoding using the erasure coding scheme and at least one TB, of the one or more TBs, wherein the at least one TB is selected using one or more time conditions, one or more group conditions, one or more settings indicated by the transmitting device, or a combination thereof.

Some aspects described herein relate to an apparatus for wireless communication at a transmitting device. The apparatus may include a memory and one or more processors, coupled to the memory. The one or more processors may be configured to receive, from an originating device, information for a receiving device. The one or more processors may be further configured to transmit, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof.

Some aspects described herein relate to a method of wireless communication performed by a receiving device. The method may include receiving, from a transmitting device that is configured to perform network coding on information from an originating device, one or more TBs including the information and associated with an erasure coding scheme. The method may further include performing decoding using the erasure coding scheme and at least one TB, of the one or more TBs, wherein the at least one TB is selected using one or more time conditions, one or more group conditions, one or more settings indicated by the transmitting device, or a combination thereof.

Some aspects described herein relate to a method of wireless communication performed by a transmitting device. The method may include receiving, from an originating device, information for a receiving device. The method may further include transmitting, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof.

Some aspects described herein relate to a non-transitory computer-readable medium that stores a set of instructions for wireless communication by a receiving device. The set of instructions, when executed by one or more processors of the receiving device, may cause the receiving device to receive, from a transmitting device that is configured to perform network coding on information from an originating device, one or more TBs including the information and associated with an erasure coding scheme. The set of instructions, when executed by one or more processors of the receiving device, may further cause the receiving device to perform decoding using the erasure coding scheme and at least one TB, of the one or more TBs, wherein the at least one TB is selected using one or more time conditions, one or more group conditions, one or more settings indicated by the transmitting device, or a combination thereof.

Some aspects described herein relate to a non-transitory computer-readable medium that stores a set of instructions for wireless communication by a transmitting device. The set of instructions, when executed by one or more processors of the transmitting device, may cause the transmitting device to receive, from an originating device, information for a receiving device. The set of instructions, when executed by one or more processors of the transmitting device, may further cause the transmitting device to transmit, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof.

Some aspects described herein relate to an apparatus for wireless communication. The apparatus may include means for receiving, from a transmitting device that is configured to perform network coding on information from an originating device, one or more TBs including the information and associated with an erasure coding scheme. The apparatus may further include means for performing decoding using the erasure coding scheme and at least one TB, of the one or more TBs, wherein the at least one TB is selected using one or more time conditions, one or more group conditions, one or more settings indicated by the transmitting device, or a combination thereof Some aspects described herein relate to an apparatus for wireless communication. The apparatus may further include means for receiving, from an originating device, information for a receiving device. The apparatus may include means for transmitting, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
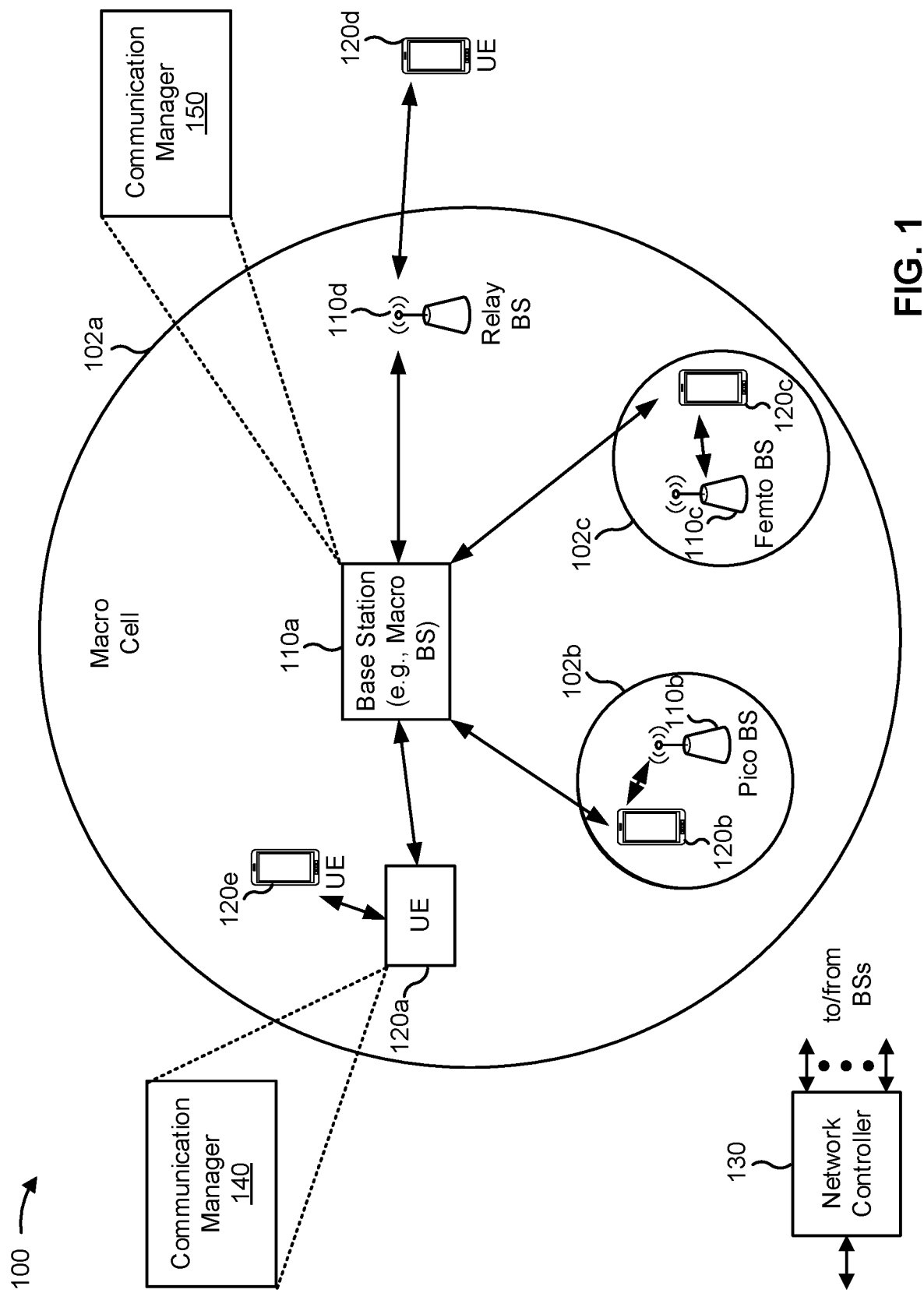
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a receiving device (e.g., UE 120) may include a communication manager 140. As described in more detail elsewhere herein, the communication manager 140 may receive, from a transmitting device (e.g., base station 110 and/or another UE 120) that is configured to perform network coding on information from an originating device, one or more transport blocks (TBs) including the information and associated with an erasure coding scheme; and perform decoding using the erasure coding scheme and at least one TB, of the one or more TBs, wherein the at least one TB is selected using one or more time conditions, one or more group conditions, one or more settings indicated by the transmitting device, or a combination thereof. Additionally, or alternatively, the communication manager 140 may perform one or more other operations described herein.

In some aspects, a transmitting device (e.g., base station 110) may include a communication manager 150. As described in more detail elsewhere herein, the communication manager 150 may receive, from an originating device (e.g., another base station or a UE), information for a receiving device (e.g., a UE); and transmit, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof. Additionally, or alternatively, the communication manager 150 may perform one or more other operations described herein.

As indicated above, FIG. 1 is provided as an example. Other examples may differ from what is described with regard to FIG. 1.

Figure 2:
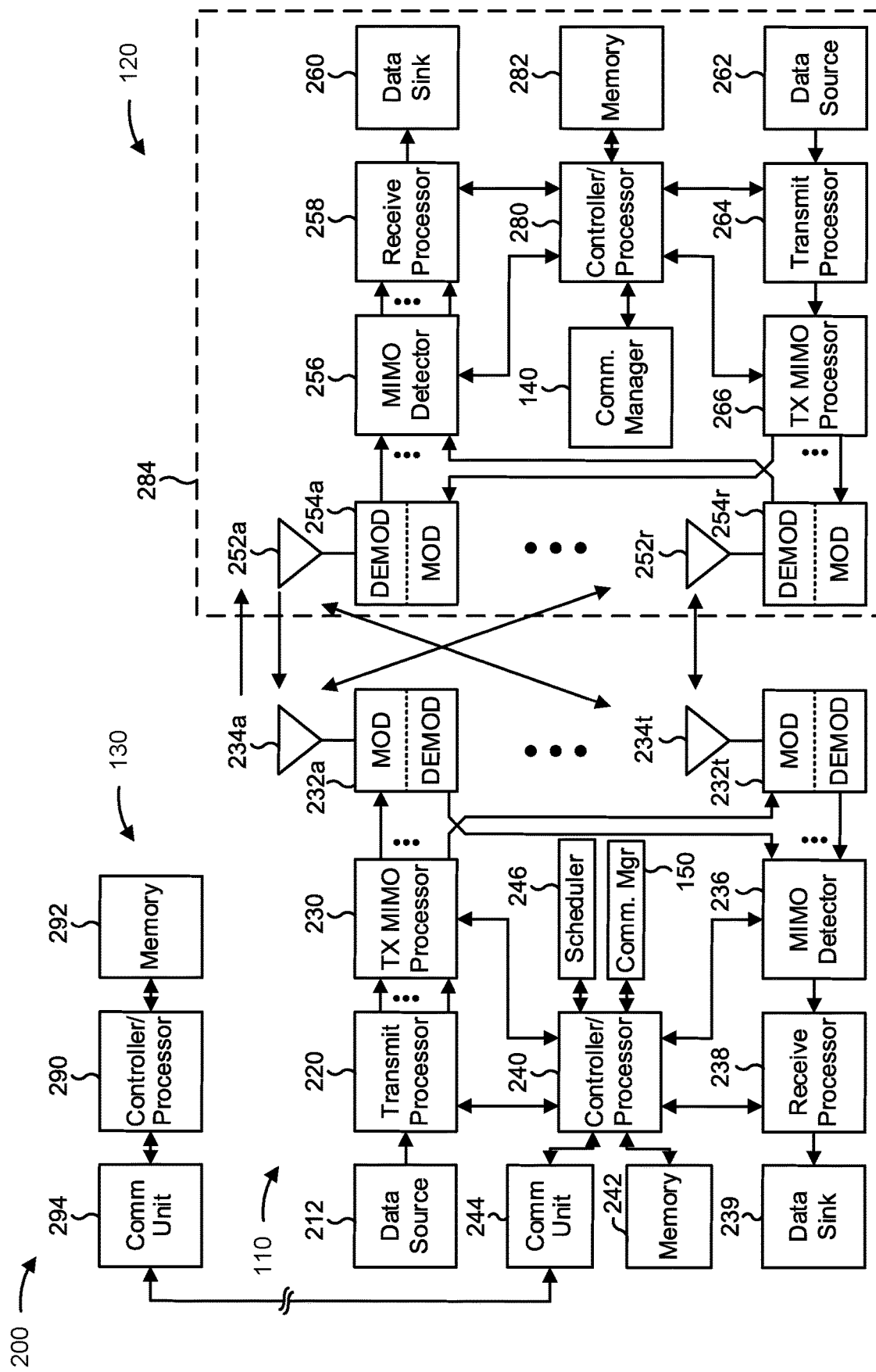
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with selecting TBs for network coding, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples. In some aspects, the transmitting device described herein is the base station 110, is included in the base station 110, includes one or more components of the base station 110 shown in FIG. 2, is the UE 120, is included in the UE 120, or includes one or more components of the UE 120 shown in FIG. 2. Similarly, the receiving device described herein is the UE 120, is included in the UE 120, or includes one or more components of the UE 120 shown in FIG. 2.

In some aspects, the receiving device includes means for receiving, from a transmitting device that is configured to perform network coding on information from an originating device, one or more TBs including the information and associated with an erasure coding scheme; and/or means for performing decoding using the erasure coding scheme and at least one TB, of the one or more TBs, wherein the at least one TB is selected using one or more time conditions, one or more group conditions, one or more settings indicated by the transmitting device, or a combination thereof In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for receiving, from an originating device, information for a receiving device; and/or means for transmitting, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
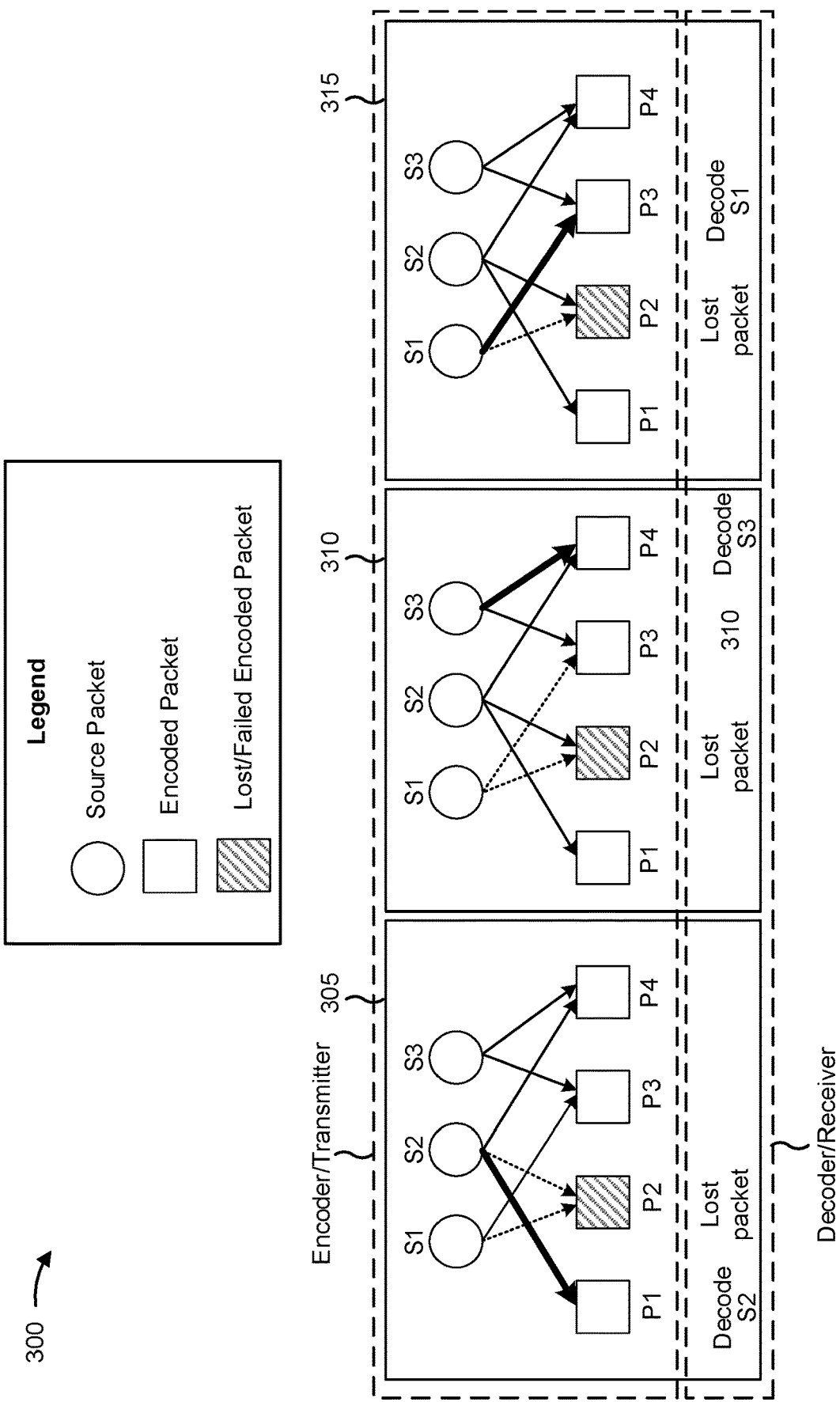
FIG. 3 is a diagram illustrating an example of network coding, in accordance with the present disclosure.

FIG. 3 is a diagram illustrating an example 300 of network coding, in accordance with the present disclosure. As shown in FIG. 3, an encoder (or transmitter) may communicate with a decoder (or receiver). The encoder is sometimes also referred to as a transmitter, an encoder node, or a transmitter node. The encoder may include a UE 120, a base station 110, and/or an integrated access and backhaul (IAB) device, among other examples. An IAB device may include an IAB donor (e.g., a central unit (CU) of an IAB donor and/or a distributed unit (DU) of an IAB donor) or an IAB node (e.g., a DU of an IAB node and/or a mobile termination (MT) of an IAB node). The decoder is sometimes also referred to as a receiver, a decoder node, or a receiver node. The decoder may include a UE 120, a base station 110, and/or an IAB device, among other examples.

As shown in FIG. 3, an encoder (or transmitter) may encode data, shown as a set of source packets or original packets (p1, p2, and p3), into a set of encoded packets using network coding. An encoded packet may be the same as a source packet, may be a redundancy version of a source packet, may include a combination of multiple source packets (e.g., a subset of the source packets), and/or may include a redundancy version of the combination. The number of encoded packets may be the same as or different than the number of source packets. In some aspects, the number of encoded packets may be unlimited (e.g., the encoder may generate any number of encoded packets), such as when using a rateless network coding scheme. In example 300, the encoder encodes K source packets (where K=3) into N encoded packets (where N=4). The encoder transmits the encoded packets to a decoder (or receiver). The decoder uses network coding to decode the encoded packets and recover the source packets. As used herein, network coding may be performed using any type of network coding scheme, such as fountain coding, linear network coding, random linear network coding, Luby transform (LT) network coding, and/or Raptor network coding.

In example 300, the encoder encodes three source packets (S1, S2, and S3) into four encoded packets: P1 (e.g., that carries S2), P2 (e.g., that carries S1+S2), P3 (e.g., that carries S1+S3), and P4 (e.g., that carries S2+S3). The encoder may transmit the four encoded packets to the decoder. In this example, the packet P2 (carrying S1+S2) is not successfully received by the decoder. In a first operation 305, the decoder decodes the packet P1 (carrying S2). In a second operation 310, the decoder obtains S3 from the packet P4 (carrying S2+S3) because the decoder has already decoded S2 and can use combining to obtain S3 from S2+S3. In a third operation 315, the decoder obtains S1 from the packet P3 (carrying S1+S3) because the decoder has already decoded S3 and can use combining to obtain S1 from S1+S3. In some aspects, an encoded packet may include an indication (e.g., in a header of the encoded packet) that indicates the source packet(s) that are included in the encoded packet. Thus, the decoder can obtain S1, S2, and S3 despite P2 failing, and using less overhead than packet data convergence protocol (PDCP) duplication. For example, PDCP duplication may duplicate all of the source packets for a total of six transmissions, while the example network coding shown in FIG. 3 uses four transmissions.

Encoding information (e.g., the plurality of source packets S1, S2, and S3) into a larger quantity of encoded packets (e.g., the plurality of encoded packets P1, P2, P3, and P4) allows the encoder and the decoder to use an erasure coding scheme, such as Reed-Solomon codes or other maximum distance separable (MDS) codes. For example, the encoder may apply a generator matrix (e.g., represented by A) to the source packets (e.g., represented by a, b, and c) to generate the encoded packets. In one example, the generator matrix may be of a form similar to $$\begin{bmatrix} 1 & 0 & 0 \\ 0 & 1 & 0 \\ 0 & 0 & 1 \\ 1 & 1 & 1 \\ 1 & \alpha & \alpha^2 \end{bmatrix}$$

where α represents a coefficient, such that the encoded packets may be represented by a, b, c, a+b+c, and a+αb+α²c. Other erasure coding schemes may include applying different generator matrices to the source packets to generate different encoded packets.

In some aspects, the encoder may select source packets to use for the erasure coding scheme according to time conditions, group conditions, and/or configured settings, as described in greater detail in connection with FIG. 5. Accordingly, in some aspects, the decoder may select decoded packets to use for packet recovery according to the same conditions and/or settings. Additionally, the decoder may discard decoded packets that are not expected to be used in future packet recovery processes based on the conditions and/or settings associated with the erasure coding scheme, which reduces memory overhead.

In some cases, the encoder may continue to transmit encoded packets (e.g., the same combination of encoded packets or different combinations of encoded packets) to the decoder until the encoder receives a notification from the decoder. For example, the decoder may successfully receive the source packets or may abort decoding, which may trigger the decoder to send a notification to the encoder. The notification may include, for example, an acknowledgement (ACK) and/or a stop message (STOP). In some cases, the decoder may transmit an ACK for each original packet that is successfully received. Additionally, or alternatively, the decoder may transmit an ACK upon successful reception of all of the source packets. Upon receiving the notification, the encoder may encode additional data (e.g., a new set of source packets, such as S4, S5, and S6) and may transmit encoded packets to the decoder, in a similar manner as described above, until all of the data has been transmitted and/or successfully received. Alternatively, to conserve network resources and reduce overhead, the encoder may not transmit an ACK or a negative acknowledgement (NACK) for received packets.

In some cases, such as when using a Raptor network coding scheme, the encoder may perform inner coding, or precoding, to generate a set of intermediate packets, that include a set of redundant packets, from the source packets. A redundant packet may be a copy of a source packet or a redundancy version of a source packet. In some aspects, a redundant packet may be a low density parity check (LDPC) packet. For example, the encoder may apply inner coding to generate K' intermediate packets (e.g., original plus redundant packets from K source packets). The encoder may then perform outer coding (e.g., fountain coding and/or LT network coding) to generate N encoded packets from the K' intermediate packets, in a similar manner as described above. As a result, the encoding and/or decoding complexity of the Raptor network coding scheme may be linear. The encoded packets may include a set of systemic packets and a set of repair packets. In some aspects, the decoder may choose to not decode a packet included in the set of systematic symbols that has a high decoding complexity (e.g., is associated with a high encoding degree and/or is associated with a high quantity of source packets). The decoder may recover the source packets associated with the packet that is not decoded from one or more packets included in the set of repair packets. The one or more packets included in the set of repair packets may be associated with a lower decoding complexity. As a result, the decoding complexity may be reduced.

As indicated above, FIG. 3 is provided as an example of network coding. Other examples of network coding may differ from what is described with regard to FIG. 3. For example, although described using packets, the description similarly applies with respect to TBs. As used herein, "transport block" or "TB" may refer to at least a portion of a packet (e.g., from a radio link control (RLC) layer in LTE and/or NR) encoded according to a transport block size (TBS) (e.g., at a medium access control (MAC) layer in LTE and/or NR).

Figure 4:
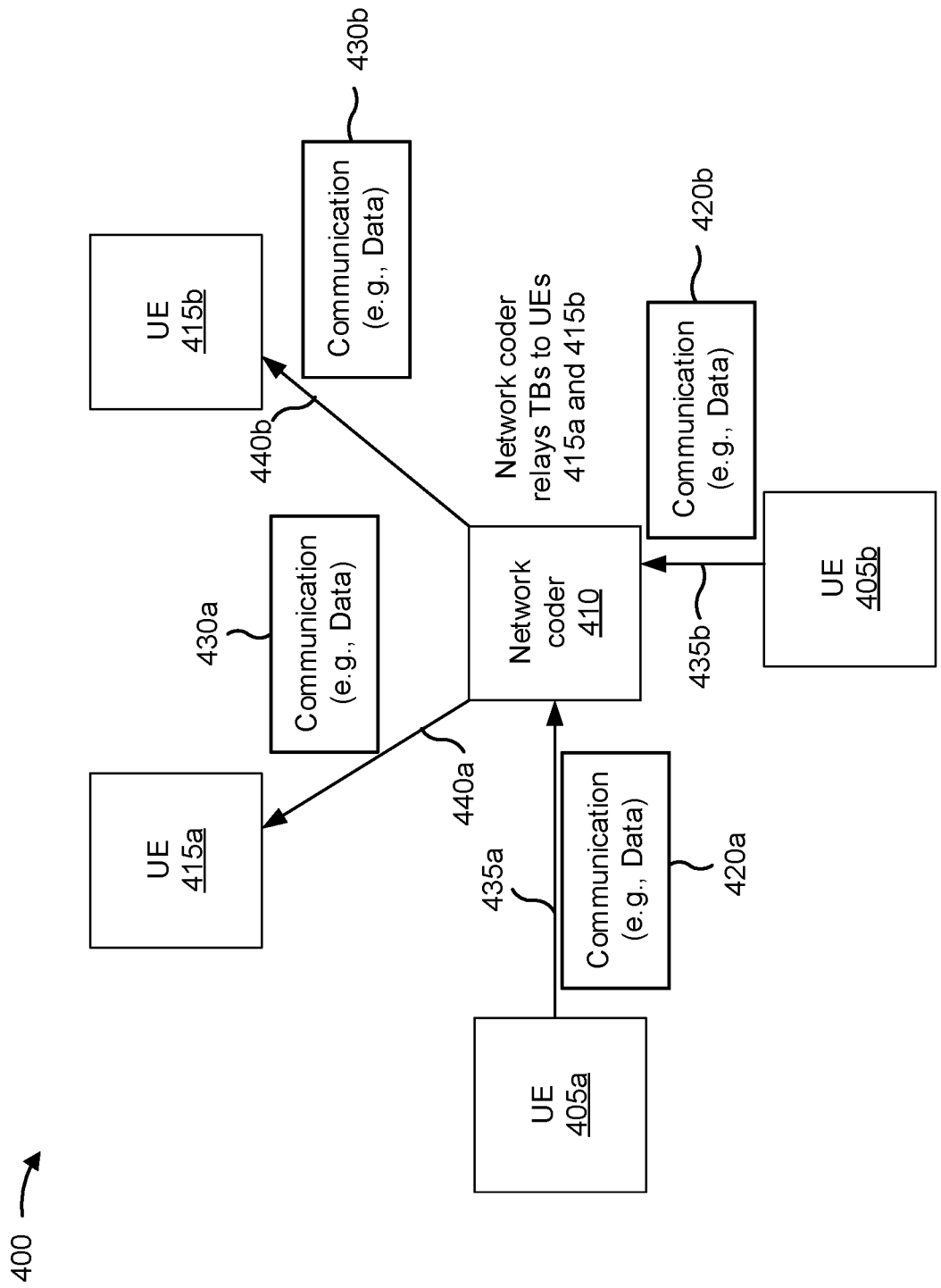
FIG. 4 is a diagram illustrating an example of a network coder that relays communications from originating devices to receiving devices, in accordance with the present disclosure.

FIG. 4 is a diagram illustrating an example 400 of a network coder that relays communications from originating devices to receiving devices, in accordance with the present disclosure. As shown, example 400 includes a plurality of originating devices (e.g., UEs 405a and 405b), a network coder 410, and a plurality of receiving devices (e.g., UEs 415a and 415b). In example 400, the originating devices are UEs, but the originating devices may additionally or alternatively include base stations, road side units (RSUs), and/or other devices. Similarly, the network coder 410 may include a UE, a base station, an RSU, and/or another device.

As shown in FIG. 4, the UE 405a may transmit a communication (e.g., data and/or control information) indirectly to the UE 415a via the network coder 410. For example, the UE 405a may transmit the communication to the network coder 410 as a communication 420a, and the network coder 410 may relay (e.g., forward or transmit) the communication to the UE 415a as a communication 430a. In some aspects, the UE 405a may communicate with the network coder 410 via link 435a (e.g., sidelink 435a), and the network coder 410 may communicate with the UE 415a via link 440a (e.g., sidelink 440a). Similarly, the UE 405b may transmit a communication (e.g., data and/or control information) indirectly to the UE 415b via the network coder 410. For example, the UE 405b may transmit the communication to the network coder 410 as a communication 420b, and the network coder 410 may relay (e.g., forward or transmit) the communication to the UE 415b as a communication 430b. In some aspects, the UE 405b may communicate with the network coder 410 via link 435b (e.g., sidelink 435b), and the network coder 410 may communicate with the UE 415b via link 440b (e.g., sidelink 440b).

In order to improve reliability of communications 430a and 430b, the network coder 410 may combine communications 420a and 420b (which may each include one or more source TBs) using a network coding technique (e.g., as described in connection with FIG. 3). Accordingly, communications 430a and 430b may be the same and may include a plurality of encoded TBs. Using network coding reduces a quantity of separate transmissions between the originating devices (e.g., UEs 405a and 405b) and the receiving devices, which reduces interference and thus increases reliability and quality of the communications. Additionally, using network coding allows for the receiving devices to recover dropped TBs, which reduces re-transmissions and thus conserves power and processing resources at the originating and the receiving devices.

To perform network coding, the network coder 410 selects a plurality of source TBs to use for generating the plurality of encoded TBs. Using additional source TBs to generate encoded TBs increases reliability by allowing for receiving devices (e.g., UEs 415a and 415b) to recover from more TB losses. Using fewer source TBs to generate encoded TBs decreases sizes of the encoded TBs, which reduces latency and conserves processing resources and power at both the network coder 410 and the receiving devices.

Some techniques and apparatuses described herein enable the network coder 410 to apply time conditions and/or group conditions to select the source TBs to use for network coding and/or to indicate settings (e.g., to the receiving devices)

used to select the source TBs to use for network coding. As a result, the network coder 410 may select a sufficient quantity of source TBs to achieve increases in reliability and quality but also without significant increases in latency and resource waste by generating encoded TBs that are too large. Additionally, by using conditions and/or indicated settings for selecting source TBs to use, the network coder 410 enables receiving devices (e.g., UEs 415a and 415b) to discard TBs that were received and decoded and are not expected to be used for decoding additional received TBs. Accordingly, the receiving devices reduce memory overhead and conserve processing resources used to attempt decoding additional received TBs because there are fewer remaining TBs to use.

As indicated above, FIG. 4 is provided as an example. Other examples may differ from what is described with respect to FIG. 4.

Figure 5:
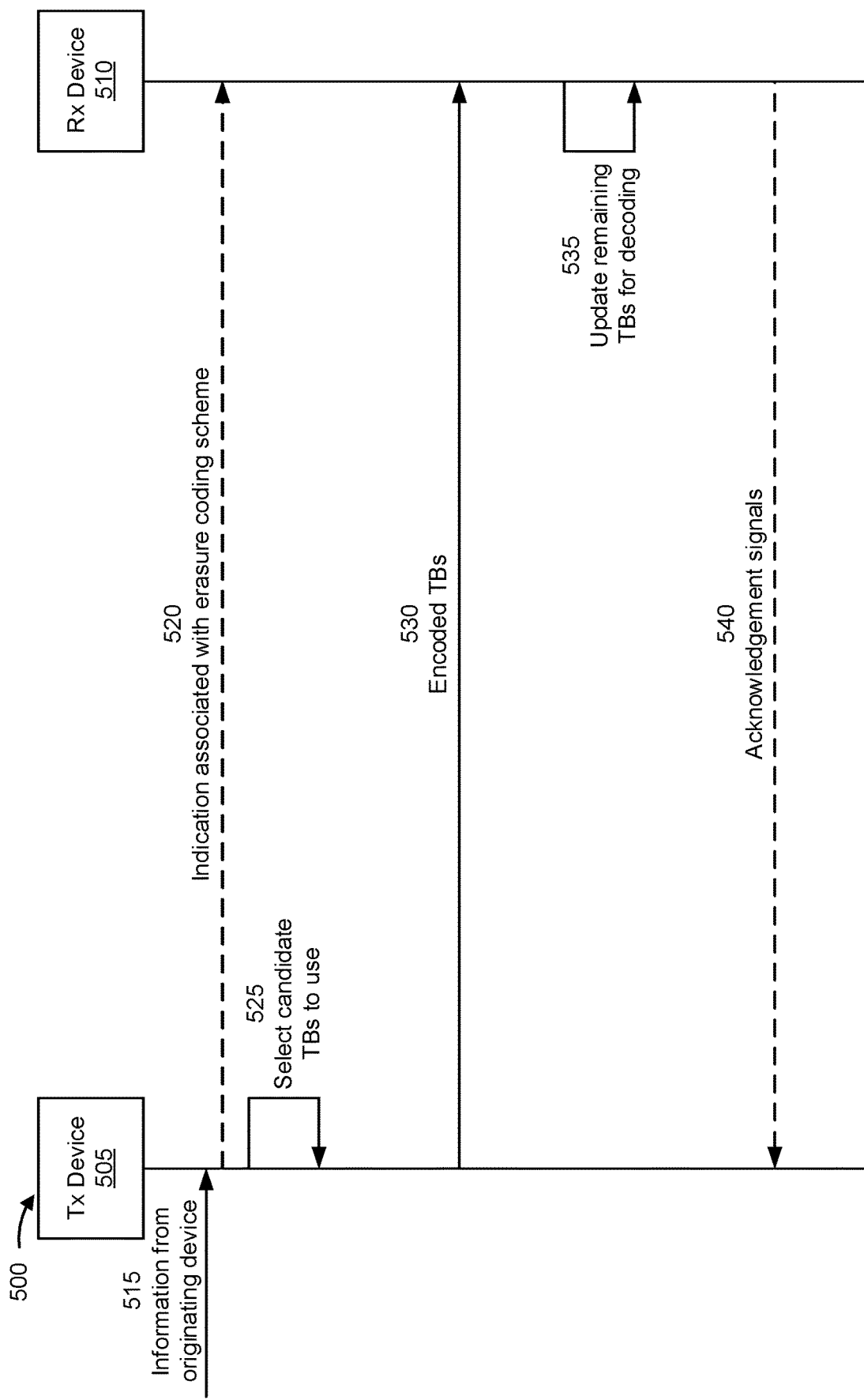
FIG. 5 is a diagram illustrating an example associated with selecting transport blocks (TBs) for network coding, in accordance with the present disclosure.

FIG. 5 is a diagram illustrating an example 500 associated with selecting TBs for network coding, in accordance with the present disclosure. As shown in FIG. 5, a transmitting (Tx) device 505 (e.g., network coder 410, the encoder of example 300, and/or another transmitting device) and a receiving (Rx) device 510 (e.g., UE 415a or 415b, the decoder of example 300, and/or another receiving device) may communicate with one another (e.g., over-the-air (OTA) on a sidelink channel).

As shown by reference number 515, an originating device (e.g., UE 405a or 405b and/or another device using the Tx device 505 to send information to the Rx device 510) may transmit, and the Tx device 505 may receive, information for the Rx device 510. For example, the information may include one or more source TBs (e.g., as described in connection with FIG. 3). In some aspects, the information may be associated with a destination identifier (ID) that indicates the Rx device 510. Although the description herein focuses on a single originating device, the description similarly applies to a plurality of originating devices transmitting information to the Tx device 505 for network coding. Additionally, or alternatively, although the description herein focuses on a single receiving device, the description similarly applies to a plurality of receiving devices for which the information from the origination device(s) is intended (e.g., as indicated by a plurality of destination IDs associated with the plurality of receiving devices).

In some aspects, and as shown by reference number 520, the Tx device 505 may transmit, and the Rx device 510 may receive, an indication of a condition and/or variable used to select TBs for use in an erasure coding scheme (e.g., as described in connection with FIG. 3). For example, the indication may be associated with one or more conditions described in greater detail below or a combination of conditions described in greater detail below. Additionally, or alternatively, the indication may be associated with a variable used to determine which TBs will be used in the erasure coding scheme.

In some aspects, the Rx device 510 may use the indication or may use the indication in combination with one or more preconfigured (e.g., stored and/or otherwise pre-programmed) rules, as described in greater detail below. As an alternative, the Rx device 510 may use only preconfigured rules such that the Tx device 505 does not transmit an indication of a condition and/or variable.

As shown by reference number 525, the Tx device 505 may select one or more candidate TBs, of a plurality of TBs including the information from the originating device(s), to use in the erasure coding scheme. For example, the plurality of TBs may be source TBs (e.g., as described in connection with FIG. 3), and the Tx device 505 may select from the source TBs to perform network coding (e.g., according to the erasure coding scheme) and generate one or more encoded TBs.

In some aspects, the Tx device 505 may select the candidate TBs using one or more time conditions. For example, the Tx device 505 may apply a time window such that any source TBs received from the originating device and/or decoded by the Tx device 505 during the time window are selected. In some aspects, a length associated with the time window (e.g., a duration of the window) may be preconfigured (e.g., stored and/or otherwise pre-programmed into the Tx device 505). For example, the length may be preconfigured according to 3GPP specifications, standards from the Institute of Electrical and Electronics Engineers (IEEE), and/or other standards. Additionally, or alternatively, the length may be associated with a resource pool including a link between the originating device and the Tx device 505 and/or a resource pool including a link between the Tx device 505 and/or the Rx device 510. For example, the originating device, the Tx device 505, the Rx device 510, and/or another device configuring the resource pool(s) (such as a base station) may indicate the length. In some aspects, the originating device, the Tx device 505, the Rx device 510, and/or the other device configuring the resource pool(s) may indicate a selection from a plurality of possible lengths in 3GPP specifications, standards from the IEEE, and/or other standards. Additionally, or alternatively, the Tx device 505 may indicate the length to the Rx device 510 (e.g., in the indication described in connection with reference number 515). In some aspects, the Tx device 505 may indicate a selection from a plurality of possible lengths in 3GPP specifications, standards from the IEEE, and/or other standards. Additionally, or alternatively, the Tx device 505 may indicate a length that is less than (or equal to) a maximum length in 3GPP specifications, standards from the IEEE, and/or other standards.

Additionally, or alternatively, the one or more time conditions may include an expiry condition. For example, each source TB may be associated with a packet delay budget (PDB) such that the Tx device 505 may determine whether a TB is expired based at least in part on the PDB and a reception time (e.g., from the originating device) associated with the TB. In some aspects, any source TBs that are not expired are selected. As an alternative, the Tx device 505 may use the expiry condition in combination with the time window. For example, the Tx device 505 may select TBs that are received from the originating device and/or decoded by the Tx device 505 during the time window and that are not expired.

Additionally, or alternatively, the Tx device 505 may select the candidate TBs using one or more group conditions. For example, the Tx device 505 may select TBs associated with a geographic zone. In some aspects, the geographic zone may be a geographic zone associated with the originating device(s), the Tx device 505, the Rx device 510, and/or another receiving device. For example, the Tx device 505 may determine locations associated with originating device(s) and/or receiving device(s) (e.g., including the Rx device 510) and associate the source TBs with different geographic zones based on source IDs and/or destination IDs included in the source TBs. In some aspects, any source TBs with the geographic zone are selected. As an alternative, the Tx device 505 may use the group condition in combination with one or more time conditions. For example, the Tx device 505 may select TBs that are received from the originating device and/or decoded by the Tx device 505 during the time window and that are associated with the geographic zone. In another example, the Tx device 505 may select TBs that are not expired and that are associated with the geographic zone. In yet another example, the Tx device 505 may select TBs that are received from the originating device and/or decoded by the Tx device 505 during the time window, that are not expired, and that are associated with the geographic zone.

Additionally, or alternatively, the one or more group conditions include a group of devices (e.g., a platoon of vehicles in V2X communications, a group of UEs receiving a multicast and/or a broadcast from the Tx device 505, and/or another group of devices). For example, the Tx device 505 may select TBs associated with the group of devices using a group ID and/or destination IDs included in the source TBs. Additionally, or alternatively, the group of devices may include a plurality of originating devices such that the Tx device 505 selects TBs associated with the group of devices using a group ID and/or source IDs included in the source TBs. In some aspects, any source TBs associated with the group of devices are selected. As an alternative, the Tx device 505 may select source TBs associated with the group of devices and associated with a geographic zone. Additionally, or alternatively, the Tx device 505 may use the group condition in combination with one or more time conditions. For example, the Tx device 505 may select TBs that are received from the originating device and/or decoded by the Tx device 505 during the time window and that are associated with the group of devices. In another example, the Tx device 505 may select TBs that are not expired and that are associated with the group of devices. In yet another example, the Tx device 505 may select TBs that are received from the originating device and/or decoded by the Tx device 505 during the time window, that are not expired, and that are associated with the group of devices.

Additionally, or alternatively, the Tx device 505 may select the candidate TBs using one or more settings (e.g., indicated as described in connection with reference number 515). For example, the Tx device 505 may indicate one or more types of TBs that are not used for network coding. In some aspects, the one or more types may include low-priority TBs (e.g., TBs associated with priorities that satisfy a priority threshold), TBs associated with video (e.g., when network coding a multimedia multicast or broadcast), and/or other types of TBs.

In some aspects, the Tx device 505 may exclude TBs from the selection even when the excluded TBs satisfy the time condition(s), the group condition(s), and/or the setting(s). For example, the Tx device 505 may exclude TBs included in a quantity of most recent transmissions (e.g., to the Rx device 510). In some aspects, the Tx device 505 may determine the quantity of most recent transmissions to use (e.g., based at least in part on a channel quality associated with a link to the Rx device 510 and/or a time delay associated with transmissions to, and/or receptions from, the Rx device 510). In some aspects, the Tx device 505 may select the quantity from a plurality of possible quantities in 3GPP specifications, standards from the IEEE, and/or other standards. Additionally, or alternatively, the Tx device 505 may determine a quantity that is less than (or equal to) a maximum quantity in 3GPP specifications, standards from the IEEE, and/or other standards. Additionally, or alternatively, the Tx device 505 may determine a time window to use such that TBs associated with transmissions to the Rx device 510 that were transmitted within the time window are excluded. For example, the Tx device 505 may determine the time window to use based at least in part on an estimated length of time between transmitting to the Rx device 510 and receiving feedback from the Rx device 510 (e.g., as described in connection with reference number 540). In some aspects, the Tx device 505 may select a length of the time window from a plurality of possible quantities in 3GPP specifications, standards from the IEEE, and/or other standards. Additionally, or alternatively, the Tx device 505 may determine a length that is less than (or equal to) a maximum length in 3GPP specifications, standards from the IEEE, and/or other standards.

Additionally, or alternatively, the Tx device 505 may exclude TBs for which feedback from the Rx device 510 (and optionally one or more additional receiving devices) has not been received. Accordingly, the Tx device 505 may not re-use source TBs for the erasure coding scheme unless and until associated feedback is received. As an alternative, the Tx device 505 may not re-use source TBs for the erasure coding scheme that are within a quantity and/or time window of most recent transmissions unless and until associated feedback is received.

Additionally, or alternatively, the Tx device 505 may exclude TBs included in a quantity of transmissions that are not associated with negative-acknowledgement signals (e.g., NACK signals, NACK messages, and/or block acknowledgements indicating a NACK). Accordingly, the Tx device 505 may not re-use source TBs for the erasure coding scheme unless and until a negative-acknowledgement is received. As an alternative, the Tx device 505 may not re-use source TBs for the erasure coding scheme that are within a quantity and/or time window of most recent transmissions unless and until negative-acknowledgement is received. Similarly, the Tx device 505 may exclude TBs included in a quantity of transmissions that are associated with only acknowledgement signals (e.g., ACK signals, ACK messages, and/or block acknowledgements indicating an ACK). For example, the Tx device 505 may exclude a source TBs that is associated with a transmission indicated as received by all destination devices associated with the source TB (e.g., the Rx device 510, optionally with one or more additional receiving devices).

In some aspects, the Tx device 505 may further reduce a quantity of selected TBs. For example, the Tx device 505 may apply the time condition(s), the group condition(s), the setting(s), and/or the exclusion(s) to obtain a quantity of selected TBs (e.g., represented as m TBs). However, the Tx device 505 may use an erasure coding scheme that is associated with a maximum quantity of TBs (e.g., represented as n TBs) smaller than the quantity of selected TBs (e.g., n<m). Accordingly, the Tx device 505 may further use a random selection to obtain n TBs from the set of m TBs. Additionally, or alternatively, the Tx device 505 may use a ranked selection to obtain n TBs from the set of m TBs. For example, the Tx device 505 may select n TBs associated with highest quantities of negative-acknowledgements. Accordingly, the Tx device 505 may prioritize source TBs that were dropped by more receiving devices. Additionally, or alternatively, the Tx device 505 may select n TBs associated with closest expiry times (e.g., based at least in part on PDBs associated with the m TBs). Accordingly, the Tx device 505 may prioritize source TBs that will expire earlier. Additionally, or alternatively, the Tx device 505 may select n TBs associated with highest priorities (e.g., as indicated in headers of the m TBs).

In some aspects, the Tx device 505 may use a combination of factors to perform the ranked selection. For example, the Tx device 505 may perform an initial ranking using one factor and perform sub-rankings (e.g., to break ties within the initial ranking) using another factor. As an alternative, the Tx device 505 may use a ranked selection based at least in part on a score. For example, the Tx device 505 may score the source TBs according to multiple factors (e.g., using an even scoring or a weighted scoring system) and rank the TBs according to the scores.

In some aspects, the Tx device 505 may use random selection within the ranked selection whenever the ranking results in ties that prevent selection of n TBs from the set of m TBs.

As shown by reference number 530, the Tx device 505 may transmit, and the Rx device 510 may receive, one or more TBs associated with the erasure coding scheme. For example, the Tx device 505 may transmit encoded TBs (e.g., using network coding with the erasure coding scheme) such that the one or more TBs are source TBs (e.g., as described in connection with FIG. 3) decoded from the larger set of encoded TBs.

Accordingly, as shown by reference number 535, the Rx device 510 may update remaining TBs, from the plurality of source TBs, to use for network decoding (e.g., according to the erasure coding scheme). For example, the Rx device 510 may use network decoding to recover source TBs that were dropped from the larger set of encoded TBs that were transmitted by the Tx device 505.

In some aspects, the Rx device 510 may update remaining TBs using the time condition(s), the group condition(s), and/or the setting(s), as described in connection with reference number 525. In some aspects, the condition(s) may be adjusted relative to the condition(s) used by the Tx device 505. For example, the Rx device 510 may use a time window relative to a reception time at the Rx device 510 rather than relative to a reception time and/or decoding time at the Tx device 505. For example, the time window may be adjusted according to a time delay associated with a link between the Tx device 505 and the Rx device 510. Additionally, or alternatively, the Rx device 510 may use a random selection and/or a ranked selection in addition to, or in lieu of, the time condition(s), the group condition(s), and/or the setting(s).

Accordingly, the Rx device 510 may discard any source TBs that were decoded and do not satisfy the condition(s). As a result, memory overhead is reduced, and the Rx device 510 conserves processing resources and power by using fewer TBs when attempting to recover dropped TBs.

In some aspects, and as shown by reference number 540, the Rx device 510 may transmit, and the Tx device 505 may receive, one or more acknowledgement signals associated with the plurality of received TBs. For example, as described in connection with FIG. 3, the Rx device 510 may transmit an ACK and/or NACK signal (e.g., associated with a hybrid automatic repeat request (HARQ) protocol) or message (e.g., associated with a Wi-Fi protocol) for each TB. As an alternative, the Rx device 510 may transmit a block ACK or a block NACK associated with the plurality of TBs. As an alternative, the Rx device 510 may refrain from transmitting acknowledgement signals. For example, the Rx device 510 may refrain from transmitting acknowledgement signals when the plurality of TBs are broadcast and/or multicast by the Tx device 505.

By using techniques as described in connection with FIG. 5, the Tx device 505 applies time conditions and/or group conditions to select the source TBs to use for the erasure coding scheme and/or indicates one or more conditions and/or variables (e.g., to the Rx device 510) used to select the source TBs to use for the erasure coding scheme. As a result, the Tx device 505 selects a sufficient quantity of source TBs to achieve increases in reliability and quality but also without significant increases in latency and resource waste by generating encoded TBs that are too large. Additionally, by using conditions and/or indications for selecting source TBs to use, the Tx device 505 enables the Rx device 510 to discard TBs that were received and decoded and are not expected to be used for decoding additional received TBs. Accordingly, the Rx device 510 reduces memory overhead and conserves processing resources used to attempt decoding additional received TBs because there are fewer remaining TBs to use.

As indicated above, FIG. 5 is provided as an example. Other examples may differ from what is described with respect to FIG. 5.

Figure 6:
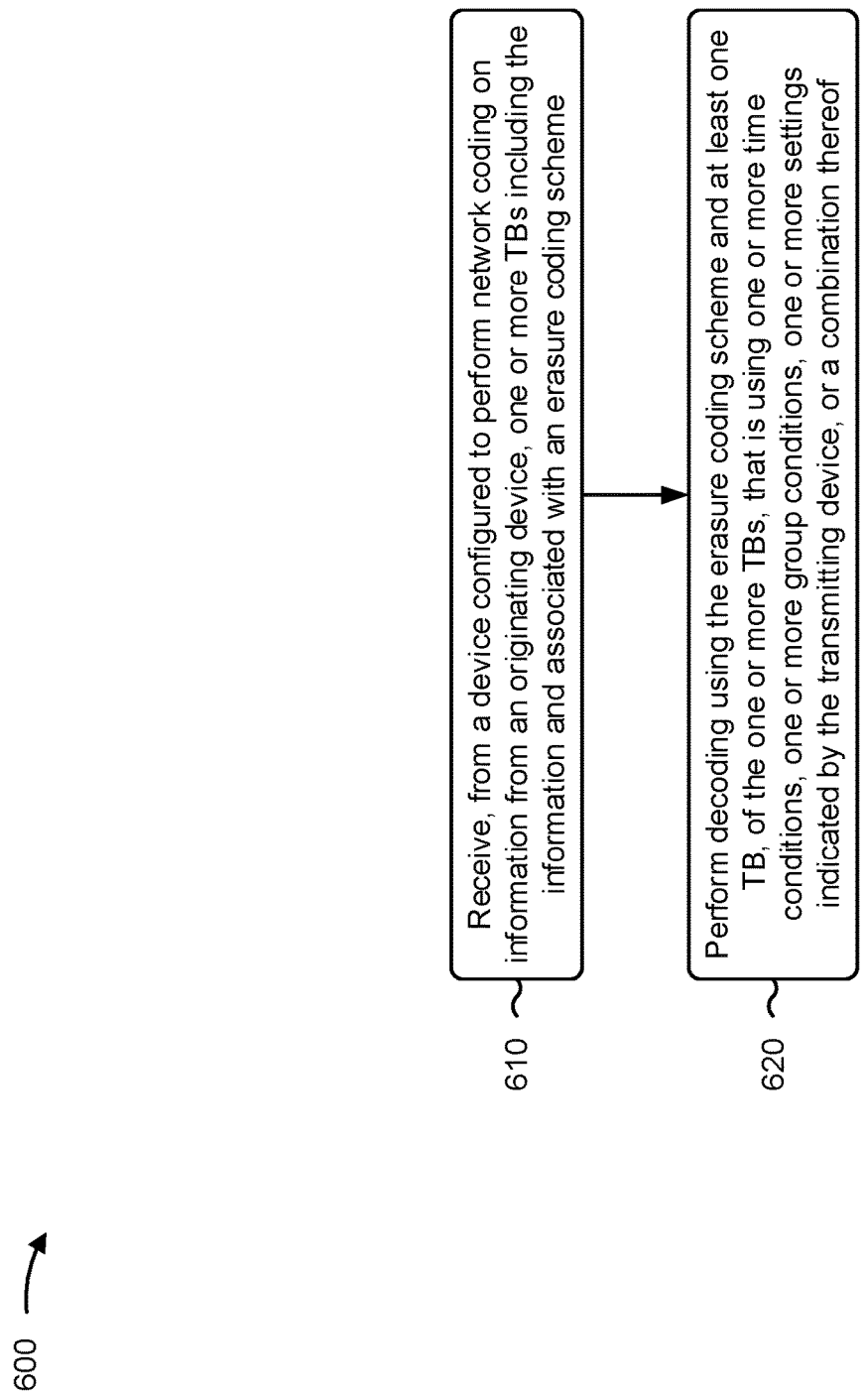
FIGS. 6 and 7 are diagrams illustrating example processes associated with selecting TBs for network coding, in accordance with the present disclosure.

FIG. 6 is a diagram illustrating an example process 600 performed, for example, by a receiving device, in accordance with the present disclosure. Example process 600 is an example where the receiving device (e.g., Rx device 510 and/or apparatus 800 of FIG. 8) performs operations associated with selecting TBs for network coding.

As shown in FIG. 6, in some aspects, process 600 may include receiving, from a transmitting device (e.g., Tx device 505 and/or apparatus 900 of FIG. 9) that is configured to perform network coding on information from an originating device, one or more TBs including the information and associated with an erasure coding scheme (block 610). For example, the receiving device (e.g., using communication manager 140 and/or reception component 802, depicted in FIG. 8) may receive, from a transmitting device that is configured to perform network coding on information from an originating device, one or more TBs including the information and associated with an erasure coding scheme, as described herein.

As further shown in FIG. 6, in some aspects, process 600 may include performing decoding using the erasure coding scheme and at least one TB, of the one or more TBs (block 620). For example, the receiving device (e.g., using communication manager 140 and/or decoding component 808, depicted in FIG. 8) may perform decoding using the erasure coding scheme and at least one TB, of the one or more TBs, as described herein. In some aspects, the at least one TB is selected using one or more time conditions, one or more group conditions, one or more settings indicated by the transmitting device, or a combination thereof.

Process 600 may include additional aspects, such as any single aspect or any combination of aspects described below and/or in connection with one or more other processes described elsewhere herein.

In a first aspect, the one or more time conditions include a time window, and the at least one TB is received or decoded within the time window.

In a second aspect, alone or in combination with the first aspect, a length associated with the time window is based at least in part on a rule stored in a memory of the receiving device.

In a third aspect, alone or in combination with one or more of the first and second aspects, process 600 further includes receiving (e.g., using communication manager 140 and/or reception component 802), from the transmitting device, an indication of a length associated with the time window.

In a fourth aspect, alone or in combination with one or more of the first through third aspects, the one or more time conditions include an expiry condition, and the at least one TB is not expired.

In a fifth aspect, alone or in combination with one or more of the first through fourth aspects, the expiry condition is based at least in part on PDBs associated with the one or more TBs.

In a sixth aspect, alone or in combination with one or more of the first through fifth aspects, the one or more group conditions include a geographic zone, and the at least one TB is associated with the geographic zone.

In a seventh aspect, alone or in combination with one or more of the first through sixth aspects, the one or more group conditions include a group of devices that includes at least one of the receiving device, the transmitting device, or the originating device, and the at least one TB is associated with the group of devices.

In an eighth aspect, alone or in combination with one or more of the first through seventh aspects, process 600 further includes receiving (e.g., using communication manager 140 and/or reception component 802), from the transmitting device, an indication of the one or more settings, such that the at least one TB is selected based at least in part on the one or more settings.

In a ninth aspect, alone or in combination with one or more of the first through eighth aspects, the at least one TB is further selected using a random selection.

In a tenth aspect, alone or in combination with one or more of the first through ninth aspects, the at least one TB is further selected using a ranked selection.

In an eleventh aspect, alone or in combination with one or more of the first through tenth aspects, the ranked selection is based at least in part on expiration times associated with a portion of the one or more TBs, priorities associated with the portion of the one or more TBs, or a combination thereof.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
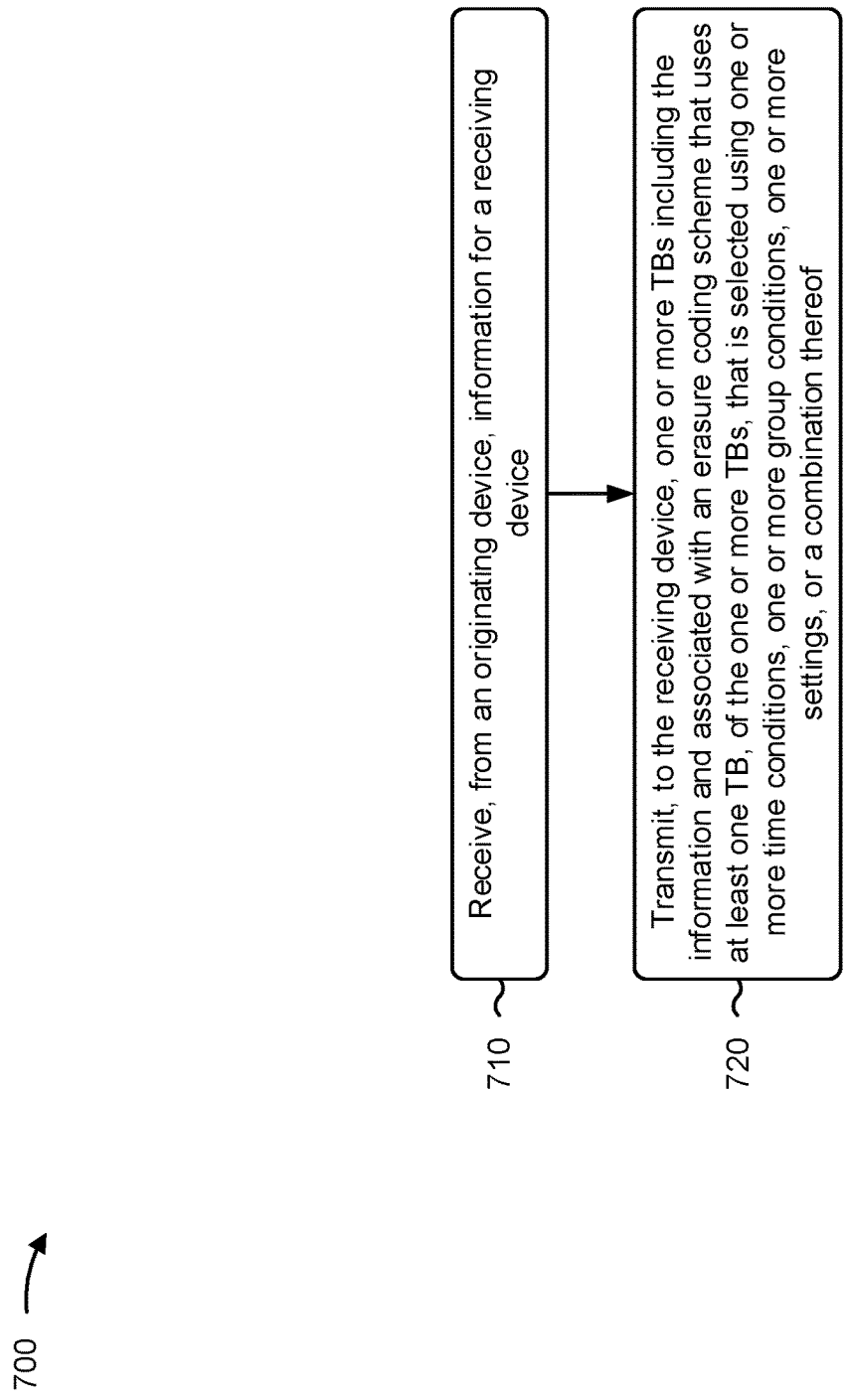

FIG. 7 is a diagram illustrating an example process 700 performed, for example, by a transmitting device, in accordance with the present disclosure. Example process 700 is an example where the transmitting device (e.g., Tx device 505 and/or apparatus 900 of FIG. 9) performs operations associated with selecting TBs for network coding.

As shown in FIG. 7, in some aspects, process 700 may include receiving, from an originating device, information for a receiving device (e.g., Rx device 510 and/or apparatus 800 of FIG. 8) (block 710). For example, the transmitting device (e.g., using communication manager 150 and/or reception component 902, depicted in FIG. 9) may receive, from an originating device, information for a receiving device, as described herein.

As further shown in FIG. 7, in some aspects, process 700 may include transmitting, to the receiving device, one or more TBs including the information and associated with an erasure coding scheme (block 720). For example, the transmitting device (e.g., using communication manager 150 and/or transmission component 904, depicted in FIG. 9) may transmit, to the receiving device, one or more TBs including the information and associated with an erasure coding scheme, as described herein. In some aspects, the erasure coding scheme uses at least one TB, of the one or more TBs, and the at least one TB is selected using one or more time conditions, one or more group conditions, one or more settings indicated by the transmitting device, or a combination thereof Process 700 may include additional aspects, such as any single aspect or any combination of aspects described below and/or in connection with one or more other processes described elsewhere herein.

In a first aspect, the one or more time conditions include a time window, and the at least one TB is received or decoded within the time window.

In a second aspect, alone or in combination with the first aspect, a length associated with the time window is based at least in part on a rule stored in a memory of the transmitting device.

In a third aspect, alone or in combination with one or more of the first and second aspects, process 700 further includes transmitting (e.g., using communication manager 150 and/or transmission component 904), to the receiving device, an indication of a length associated with the time window.

In a fourth aspect, alone or in combination with one or more of the first through third aspects, the one or more time conditions include an expiry condition, and the at least one TB is not expired.

In a fifth aspect, alone or in combination with one or more of the first through fourth aspects, the expiry condition is based at least in part on PDBs associated with the one or more TBs.

In a sixth aspect, alone or in combination with one or more of the first through fifth aspects, the one or more group conditions include a geographic zone, and the at least one TB is associated with the geographic zone.

In a seventh aspect, alone or in combination with one or more of the first through sixth aspects, the one or more group conditions include a group of devices that includes at least one of the receiving device, the transmitting device, or the originating device, and the at least one TB is associated with the group of devices.

In an eighth aspect, alone or in combination with one or more of the first through seventh aspects, process 700 further includes transmitting (e.g., using communication manager 150 and/or transmission component 904), to the receiving device, an indication of the one or more settings, such that the at least one TB is selected based at least in part on the one or more settings.

In a ninth aspect, alone or in combination with one or more of the first through eighth aspects, the at least one TB excludes TBs included in a quantity of most recent transmissions.

In a tenth aspect, alone or in combination with one or more of the first through ninth aspects, feedback associated with the quantity of most recent transmissions has not been received.

In an eleventh aspect, alone or in combination with one or more of the first through tenth aspects, the at least one TB excludes TBs included in a quantity of transmissions that are not associated with negative-acknowledgement signals.

In a twelfth aspect, alone or in combination with one or more of the first through eleventh aspects, the at least one TB is further selected using a random selection.

In a thirteenth aspect, alone or in combination with one or more of the first through twelfth aspects, the at least one TB is further selected using a ranked selection.

In a fourteenth aspect, alone or in combination with one or more of the first through thirteenth aspects, the ranked selection is based at least in part on quantities of negative-acknowledgement signals associated with a portion of the one or more TBs, expiration times associated with the portion of the one or more TBs, priorities associated with the portion of the one or more TBs, or a combination thereof.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
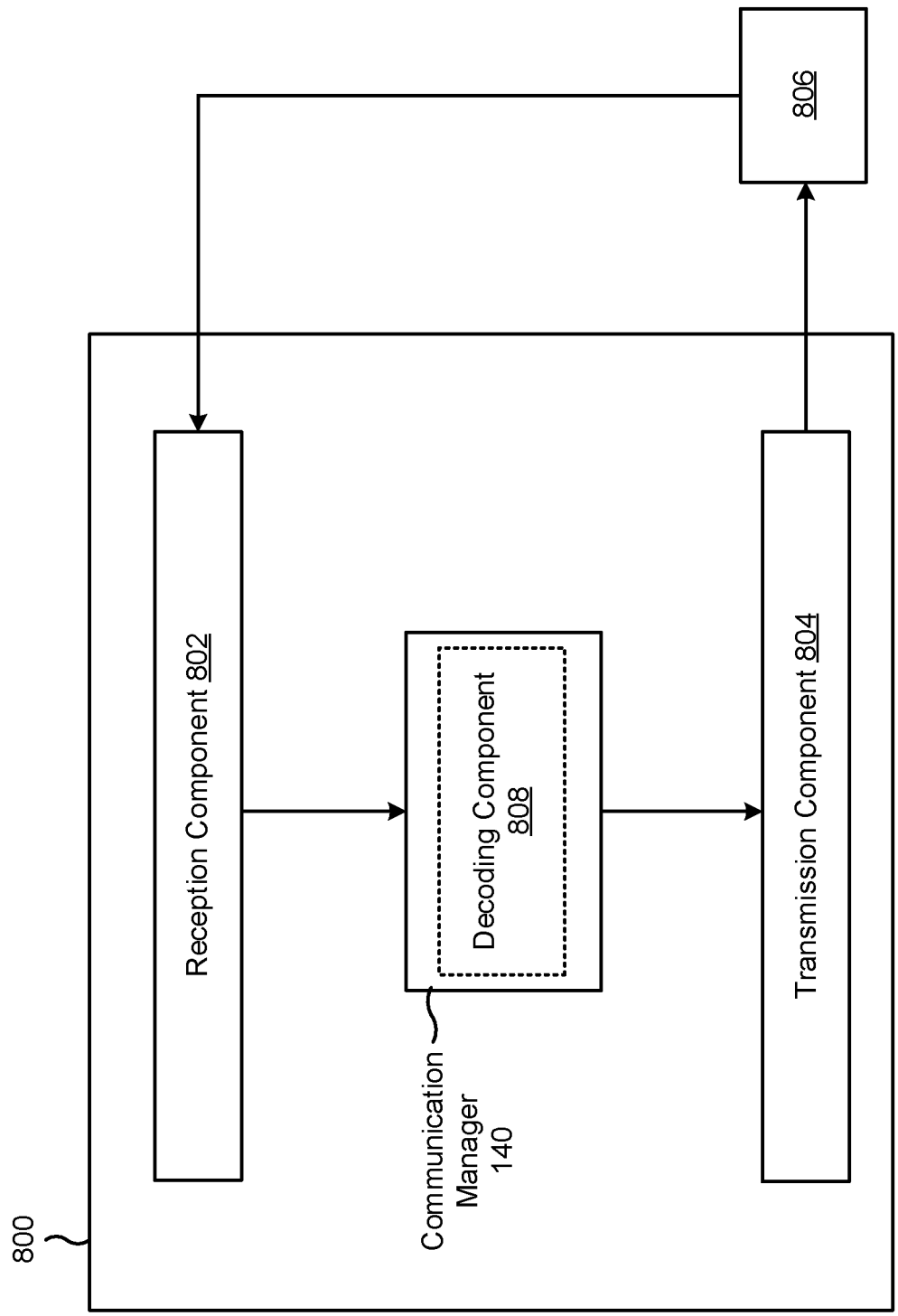
FIGS. 8 and 9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. Although described with reference to a UE, the apparatus 800 may additionally or alternatively be, or be included in, another receiving device, such as an RSU, a base station, or an IAB device, among other examples. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a decoding component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

In some aspects, the reception component 802 may receive (e.g., from the apparatus 806, which is configured to perform network coding on information from an originating device) one or more TBs associated with an erasure coding scheme. Accordingly, the decoding component 808 may perform decoding using the erasure coding scheme and at least one TB, of the one or more TBs. The at least one TB is selected using one or more time conditions, one or more group conditions, one or more settings indicated by the apparatus 806, or a combination thereof. In some aspects, the decoding component 808 may include a modem, a demodulator, a MIMO detector, a receive processor, a controller/processor, a memory, or a combination thereof, of the UE described in connection with FIG. 2.

In some aspects, the reception component 802 may further receive (e.g., from the apparatus 806) an indication of a length associated with a time window used to select the at least one TB. Additionally, or alternatively, the reception component 802 may receive (e.g., from the apparatus 806) an indication of the one or more settings, such that the at least one TB is selected based at least in part on the one or more settings.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
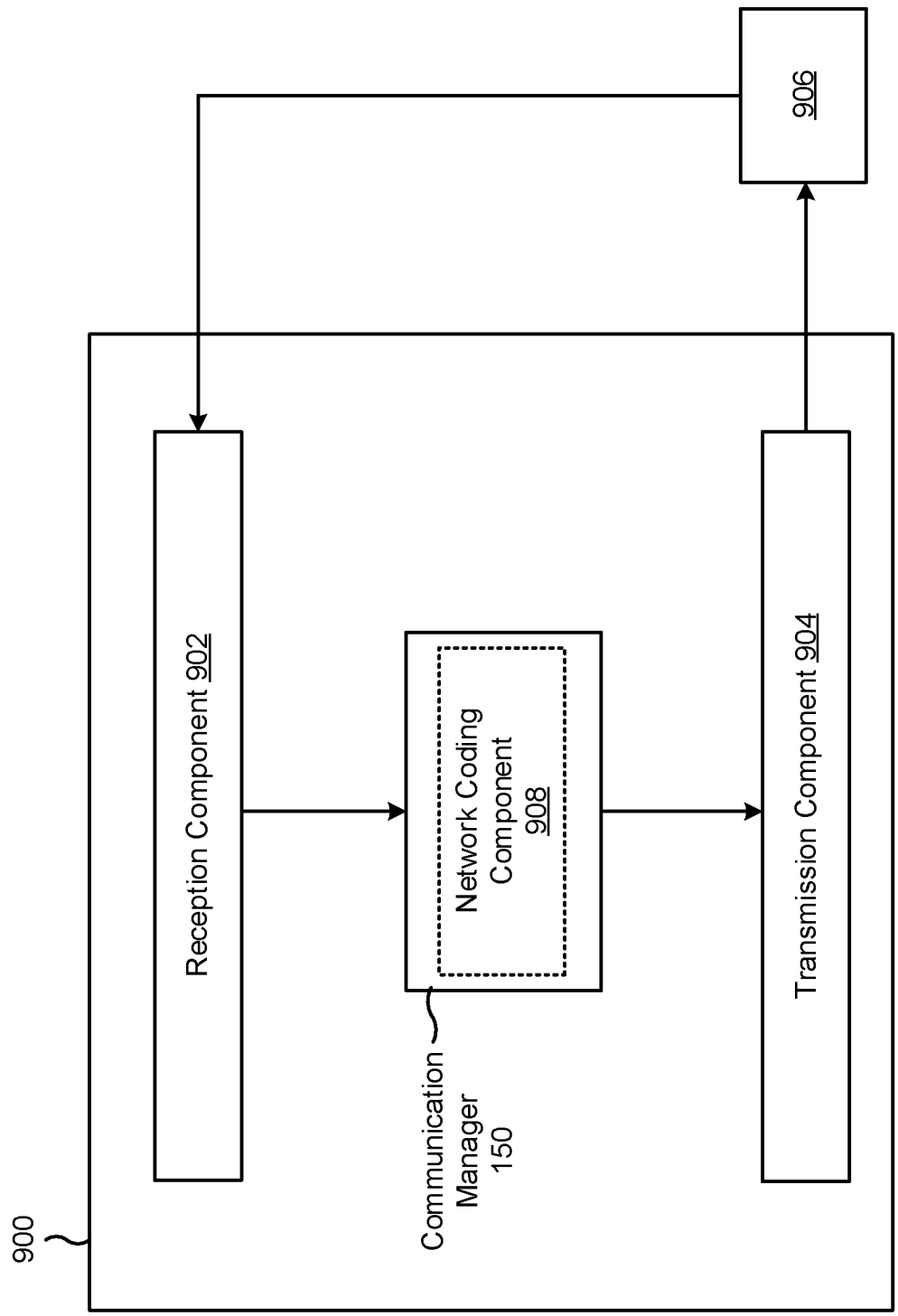

FIG. 9 is a diagram of an example apparatus 900 for wireless communication. The apparatus 900 may be a base station, or a base station may include the apparatus 900. Although described with reference to a base station, the apparatus 800 may additionally or alternatively be, or be included in, another transmitting device, such as an RSU, a UE, or an IAB device, among other examples. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a network coding component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

In some aspects, the reception component 902 may receive, from an originating device, information for the apparatus 906. Accordingly, the transmission component 904 may transmit (e.g., to the apparatus 906) one or more TBs including the information and associated with an erasure coding scheme. The erasure coding scheme uses at least one TB, of the one or more TBs. For example, the network coding component 908 may select the at least one TB using one or more time conditions, one or more group conditions, one or more settings indicated by the transmitting device, or a combination thereof. In some aspects, the network coding component 908 may include a modem, a modulator, a transmit MIMO processor, a transmit processor, a controller/processor, a memory, or a combination thereof, of the base station described in connection with FIG. 2.

In some aspects, the transmission component 904 may further transmit (e.g., to the apparatus 906) an indication of a length associated with a time window used to select the at least one TB. Additionally, or alternatively, the transmission component 904 may transmit (e.g., to the apparatus 906) an indication of the one or more settings, such that the at least one TB is selected based at least in part on the one or more settings.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a receiving device, comprising: receiving, from a transmitting device that is configured to perform network coding on information from an originating device, one or more transport blocks (TBs) including the information and associated with an erasure coding scheme; and performing decoding using the erasure coding scheme and at least one TB, of the one or more TBs, wherein the at least one TB is selected using one or more time conditions, one or more group conditions, one or more settings indicated by the transmitting device, or a combination thereof.

Aspect 2: The method of Aspect 1, wherein the one or more time conditions include a time window, and the at least one TB is received or decoded within the time window.

Aspect 3: The method of Aspect 2, wherein a length associated with the time window is based at least in part on a rule stored in a memory of the receiving device.

Aspect 4: The method of any of Aspects 2 through 3, further comprising: receiving, from the transmitting device, an indication of a length associated with the time window.

Aspect 5: The method of any of Aspects 1 through 4, wherein the one or more time conditions include an expiry condition, and the at least one TB is not expired.

Aspect 6: The method of Aspect 5, wherein the expiry condition is based at least in part on packet delay budgets (PDBs) associated with the one or more TBs.

Aspect 7: The method of any of Aspects 1 through 6, wherein the one or more group conditions include a geographic zone, and the at least one TB is associated with the geographic zone.

Aspect 8: The method of any of Aspects 1 through 7, wherein the one or more group conditions include a group of devices that includes at least one of the receiving device, the transmitting device, or the originating device, and the at least one TB is associated with the group of devices.

Aspect 9: The method of any of Aspects 1 through 8, further comprising: receiving, from the transmitting device, an indication of the one or more settings, wherein the at least one TB is selected based at least in part on the one or more settings.

Aspect 10: The method of any of Aspects 1 through 9, wherein the at least one TB is further selected using a random selection.

Aspect 11: The method of any of Aspects 1 through 10, wherein the at least one TB is further selected using a ranked selection.

Aspect 12: The method of Aspect 11, wherein the ranked selection is based at least in part on expiration times associated with a portion of the one or more TBs, priorities associated with the portion of the one or more TBs, or a combination thereof.

Aspect 13: A method of wireless communication performed by a transmitting device, comprising: receiving, from an originating device, information for a receiving device; and transmitting, to the receiving device, one or more TBs including the information and associated with an erasure coding scheme, wherein the erasure coding scheme uses at least one TB, of the one or more TBs, wherein the at least one TB is selected using one or more time conditions, one or more group conditions, one or more settings indicated by the transmitting device, or a combination thereof Aspect 14: The method of Aspect 13, wherein the one or more time conditions include a time window, and the at least one TB is received or decoded within the time window.

Aspect 15: The method of Aspect 14, wherein a length associated with the time window is based at least in part on a rule stored in a memory of the transmitting device.

Aspect 16: The method of any of Aspects 14 through 15, further comprising: transmitting, to the receiving device, an indication of a length associated with the time window.

Aspect 17: The method of any of Aspects 13 through 16, wherein the one or more time conditions include an expiry condition, and the at least one TB is not expired.

Aspect 18: The method of Aspect 17, wherein the expiry condition is based at least in part on packet delay budgets (PDBs) associated with the one or more TBs.

Aspect 19: The method of any of Aspects 13 through 18, wherein the one or more group conditions include a geographic zone, and the at least one TB is associated with the geographic zone.

Aspect 20: The method of any of Aspects 13 through 19, wherein the one or more group conditions include a group of devices that includes at least one of the receiving device, the transmitting device, or the originating device, and the at least one TB is associated with the group of devices.

Aspect 21: The method of any of Aspects 13 through 20, further comprising: transmitting, to the receiving device, an indication of the one or more settings, wherein the at least one TB is selected based at least in part on the one or more settings.

Aspect 22: The method of any of Aspects 13 through 21, wherein the at least one TB excludes TBs included in a quantity of most recent transmissions.

Aspect 23: The method of Aspect 22, wherein feedback associated with the quantity of most recent transmissions has not been received.

Aspect 24: The method of any of Aspects 13 through 23, wherein the at least one TB excludes TBs included in a quantity of transmissions that are not associated with negative-acknowledgement signals.

Aspect 25: The method of any of Aspects 13 through 24, wherein the at least one TB is further selected using a random selection.

Aspect 26: The method of any of Aspects 13 through 25, wherein the at least one TB is further selected using a ranked selection.

Aspect 27: The method of Aspect 26, wherein the ranked selection is based at least in part on quantities of negative-acknowledgement signals associated with a portion of the one or more TBs, expiration times associated with the portion of the one or more TBs, priorities associated with the portion of the one or more TBs, or a combination thereof.

Aspect 28: An apparatus for wireless communication at a device, comprising a processor; memory coupled with the processor; and instructions stored in the memory and executable by the processor to cause the apparatus to perform the method of one or more of Aspects 1-12.

Aspect 29: A device for wireless communication, comprising a memory and one or more processors coupled to the memory, the one or more processors configured to perform the method of one or more of Aspects 1-12.

Aspect 30: An apparatus for wireless communication, comprising at least one means for performing the method of one or more of Aspects 1-12.

Aspect 31: A non-transitory computer-readable medium storing code for wireless communication, the code comprising instructions executable by a processor to perform the method of one or more of Aspects 1-12.

Aspect 32: A non-transitory computer-readable medium storing a set of instructions for wireless communication, the set of instructions comprising one or more instructions that, when executed by one or more processors of a device, cause the device to perform the method of one or more of Aspects 1-12.

Aspect 33: An apparatus for wireless communication at a device, comprising a processor; memory coupled with the processor; and instructions stored in the memory and executable by the processor to cause the apparatus to perform the method of one or more of Aspects 13-27.

Aspect 34: A device for wireless communication, comprising a memory and one or more processors coupled to the memory, the one or more processors configured to perform the method of one or more of Aspects 13-27.

Aspect 35: An apparatus for wireless communication, comprising at least one means for performing the method of one or more of Aspects 13-27.

Aspect 36: A non-transitory computer-readable medium storing code for wireless communication, the code comprising instructions executable by a processor to perform the method of one or more of Aspects 13-27.

Aspect 37: A non-transitory computer-readable medium storing a set of instructions for wireless communication, the set of instructions comprising one or more instructions that, when executed by one or more processors of a device, cause the device to perform the method of one or more of Aspects 13-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a receiving device, comprising:
    one or more memories; and
    one or more processors, based at least in part on information stored in the one or more memories, configured to:
        receive, via a sidelink and from a transmitting device that is configured to perform network coding on information from an originating device, an indication of one or more conditions used by the transmitting device to select one or more transport blocks (TBs) for use in an erasure coding scheme, wherein the one or more conditions used by the transmitting device to select the one or more TBs for use in the erasure coding scheme include at least a time window or an expiry condition;
        receive, via the sidelink and from the transmitting device, the one or more TBs including the information and associated with the erasure coding scheme; and
        perform decoding using the erasure coding scheme and at least one TB, of the one or more TBs, wherein the at least one TB is selected, from the one or more TBs and for performing the decoding, using the one or more of conditions indicated by the transmitting device.

2. The apparatus of claim 1, wherein the one or more conditions include the time window, and the at least one TB is received from the originating device or decoded by the transmitting device within the time window.

3. The apparatus of claim 2, wherein a length associated with the time window is based at least in part on a rule stored in the one or more memories.

4. The apparatus of claim 2, wherein the one or more processors are further configured to:
    receive, from the transmitting device, an indication of a length associated with the time window.

5. The apparatus of claim 1, wherein the one or more conditions include the expiry condition, and the at least one TB is not expired.

6. The apparatus of claim 5, wherein the expiry condition is based at least in part on packet delay budgets (PDBs) associated with the one or more TBs.

7. The apparatus of claim 1, wherein the one or more conditions include a geographic zone, and the at least one TB is selected for use in the erasure coding scheme based at least in part on being associated with the geographic zone.

8. The apparatus of claim 1, wherein the one or more conditions include a group of devices that includes at least one of the receiving device, the transmitting device, or the originating device, and the at least one TB is associated with the group of devices.

9. The apparatus of claim 1, wherein the one or more processors are further configured to:
    receive, from the transmitting device, an indication of one or more settings, wherein the at least one TB is further selected based at least in part on the one or more settings.

10. The apparatus of claim 1, wherein the at least one TB is further selected using a random selection.

11. The apparatus of claim 1, wherein the at least one TB is further selected using a ranked selection.

12. The apparatus of claim 11, wherein the ranked selection is based at least in part on expiration times associated with a portion of the one or more TBs, priorities associated with the portion of the one or more TBs, or a combination thereof.

13. An apparatus for wireless communication at a transmitting device, comprising:
    one or more memories; and
    one or more processors, based at least in part on information stored in the one or more memories, configured to:
        transmit, via a sidelink and to a receiving device, an indication of one or more conditions used by the transmitting device to select one or more transport blocks (TBs) for use in an erasure coding scheme, wherein the one or more conditions used by the transmitting device to select the one or more TBs for use in the erasure coding scheme include at least a time window or an expiry condition;
        receive, from an originating device, information for the receiving device; and transmit, via the sidelink and to the receiving device, the one or more transport blocks (TBs) including the information and associated with the erasure coding scheme, wherein the erasure coding scheme uses at least one TB, of the one or more TBs, wherein the at least one TB is selected, from the one or more TBs and for the erasure coding scheme, using the one or more of conditions indicated by the transmitting device.

14. The apparatus of claim 13, wherein the one or more conditions include the time window, and the at least one TB is received from the originating device or decoded by the transmitting device within the time window.

15. The apparatus of claim 14, wherein a length associated with the time window is based at least in part on a rule stored in the one or more memories.

16. The apparatus of claim 14, wherein the one or more processors are further configured to:
transmit, to the receiving device, an indication of a length associated with the time window.

17. The apparatus of claim 13, wherein the one or more conditions include the expiry condition, and the at least one TB is not expired.

18. The apparatus of claim 17, wherein the expiry condition is based at least in part on packet delay budgets (PDBs) associated with the one or more TBs.

19. The apparatus of claim 13, wherein the one or more conditions include a geographic zone, and the at least one TB is selected for use in the erasure coding scheme based at least in part on being associated with the geographic zone.

20. The apparatus of claim 13, wherein the one or more conditions include a group of devices that includes at least one of the receiving device, the transmitting device, or the originating device, and the at least one TB is associated with the group of devices.

21. The apparatus of claim 13, wherein the one or more processors are further configured to:
transmit, to the receiving device, an indication of one or more settings, wherein the at least one TB is further selected based at least in part on the one or more settings.

22. The apparatus of claim 13, wherein the at least one TB excludes TBs included in a quantity of most recent transmissions.

23. The apparatus of claim 22, wherein feedback associated with the quantity of the most recent transmissions has not been received.

24. The apparatus of claim 13, wherein the at least one TB excludes TBs included in a quantity of transmissions that are not associated with negative-acknowledgement signals.

25. The apparatus of claim 13, wherein the at least one TB is further selected using a random selection.

26. The apparatus of claim 13, wherein the at least one TB is further selected using a ranked selection.

27. The apparatus of claim 26, wherein the ranked selection is based at least in part on quantities of negative-acknowledgement signals associated with a portion of the one or more TBs, expiration times associated with the portion of the one or more TBs, priorities associated with the portion of the one or more TBs, or a combination thereof.

28. A method of wireless communication performed by a receiving device, comprising:
receiving, via a sidelink and from a transmitting device that is configured to perform network coding on information from an originating device, an indication of one or more conditions used by the transmitting device to select one or more transport blocks (TBs) for use in an erasure coding scheme, wherein the one or more conditions used by the transmitting device to select the one or more TBs for use in the erasure coding scheme include at least a time window or an expiry condition;
receiving, via the sidelink and from the transmitting device, the one or more TBs including the information and associated with the erasure coding scheme; and
performing decoding using the erasure coding scheme and at least one TB, of the one or more TBs, wherein the at least one TB is selected, from the one or more TBs and for performing the decoding, using the one or more of conditions indicated by the transmitting device.

29. The method of claim 28, wherein the one or more conditions include the time window, and the at least one TB is received from the originating device or decoded by the transmitting device within the time window.

30. A method of wireless communication performed by a transmitting device, comprising:
transmitting, via a sidelink and to a receiving device, an indication of one or more conditions and group conditions used by the transmitting device to select one or more transport blocks (TBs) for use in an erasure coding scheme, wherein the one or more conditions used by the transmitting device to select the one or more TBs for use in the erasure coding scheme include at least a time window or an expiry condition;
receiving, from an originating device, information for the receiving device; and
transmitting, via the sidelink and to the receiving device, the one or more transport blocks (TBs) including the information and associated with the erasure coding scheme, wherein the erasure coding scheme uses at least one TB, of the one or more TBs, wherein the at least one TB is selected, from the one or more TBs and for the erasure coding scheme, using the one or more of conditions indicated by the transmitting device.

* * * * *